May 14, 1968　　　　J. W. RYAN　　　　3,383,114
TEACHING DEVICE
Filed April 30, 1965　　　　　　　　　　　　4 Sheets-Sheet 1
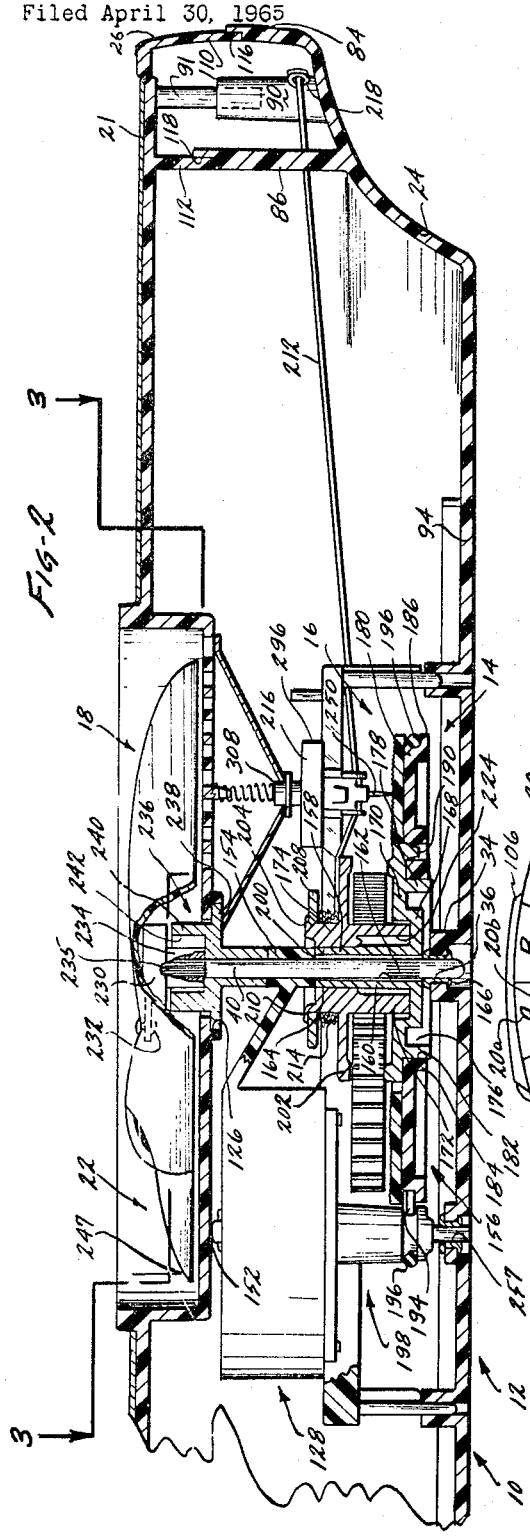
INVENTOR
JOHN W. RYAN
BY
Herzig & Walsh
ATTORNEYS May 14, 1968     J. W. RYAN     3,383,114

TEACHING DEVICE

Filed April 30, 1965     4 Sheets-Sheet 2

INVENTOR
JOHN W. RYAN

BY
Helzig & Walsh
ATTORNEYS

May 14, 1968
J. W. RYAN
3,383,114
TEACHING DEVICE
Filed April 30, 1965
4 Sheets-Sheet 3
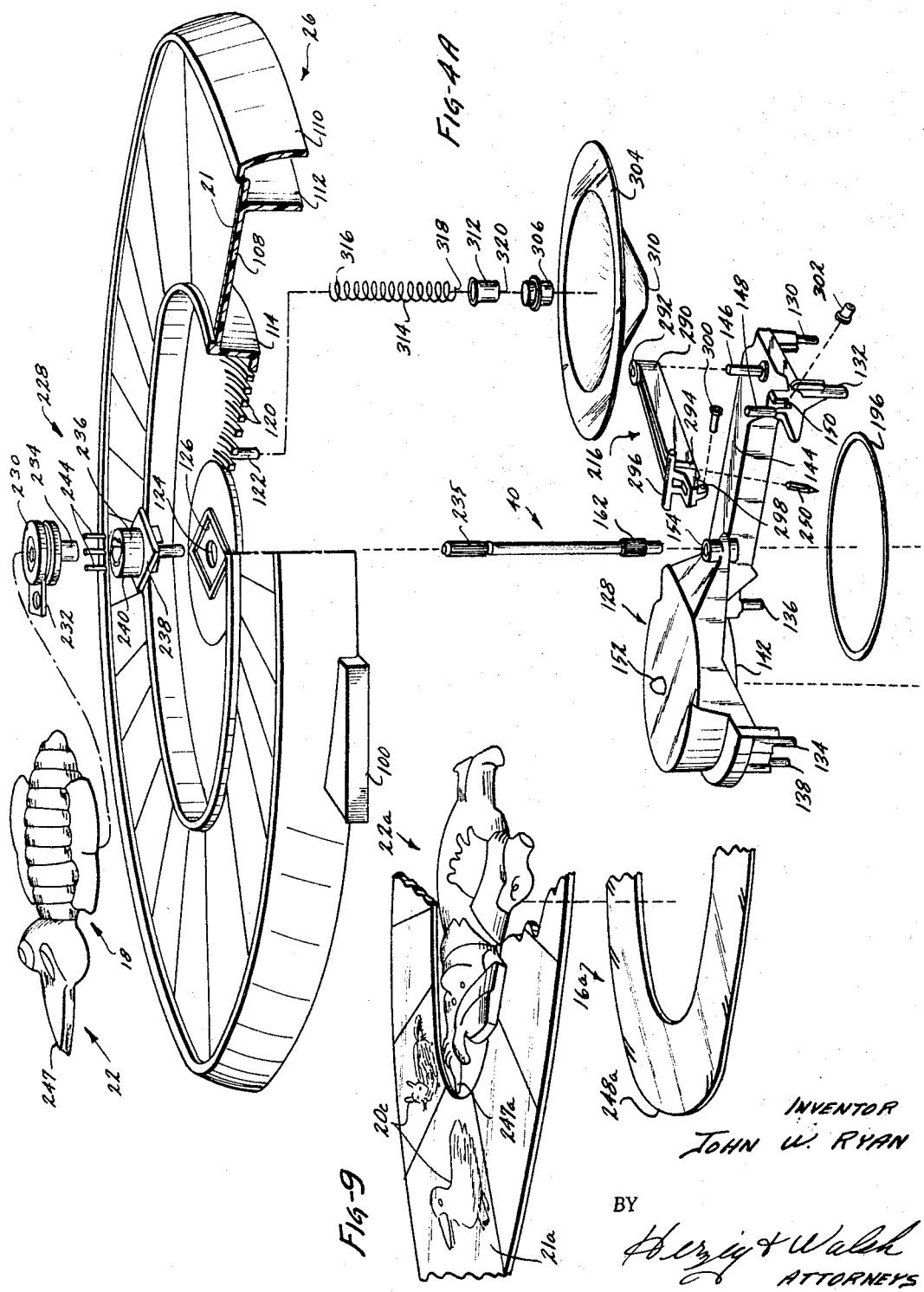
INVENTOR
JOHN W. RYAN
BY
Herzig & Walsh
ATTORNEYS May 14, 1968

J. W. RYAN 3,383,114

TEACHING DEVICE

Filed April 30, 1965

INVENTOR
JOHN W. RYAN

BY
Herzig & Walsh
ATTORNEYS

United States Patent Office 3,383,114
Patented May 14, 1968

3,383,114
TEACHING DEVICE
John W. Ryan, Bel Aire, Calif., assignor to Mattel, Inc.,
a corporation of California
Filed Apr. 30, 1965, Ser. No. 452,107
7 Claims. (Cl. 274—2)

ABSTRACT OF THE DISCLOSURE

A child's phonograph record has various sounds recorded thereon in spiral, interleaved grooves each having a starting point on the periphery of the record. The record is mounted in a housing having indicia provided thereon indicative of the recorded sounds. The child may position the record to play a particular groove by moving an indicator to one of the indicia. The indicia may comprise pictures of animals, letters of the alphabet or the like. The recorded sounds are animal sounds when animal pictures are used and are descriptions of individual letters when the alphabet is used.

Background of the invention

The background of the invention is set forth in two parts:

Field of the invention

The present invention relates to a new and useful teaching device and more particularly to a new and useful teaching device having sound reproducing means which may be conditioned by a user of the device to reproduce predetermined segments of recorded information, related to a subject about which said user wishes to be informed. The reproducing means may conveniently comprise a multiple speech phonograph device generally of the type disclosed in Patent No. 3,017,187 which is used in combination with means for teaching user of the device useful information about particular subjects selected by the user.

Description of the prior art

Patent No. 3,017,187 discloses a phonograph device in the form of a toy which is operative in response to a simple manipulation to speak or pronounce any one of a number of different sentences. The toy is shown in said patent in the form of a doll which embodies the phonograph device. A child user may cause the doll to speak or pronounce a number of different sentences by a simple manipulation such as, for example, the pulling of a draw string. The phonograph device employs a record having a plurality of spaced, spiral grooves which are separate in a sense that each reproduces a separate and distinct sentence. Means are provided in the doll whereby, in response to a simple manipulation such as, for example, the pulling of a draw string, the needle of a tone arm is lifted from the record and moved to the periphery of the record which is the starting point of one or another of the spiral grooves. The tone arm moves relatively to the reproducing cone which is stationary in the doll. The particular sentence which will be reproduced when the child user manipulates the doll by pulling the draw string is a matter of chance depending upon which spiral groove happens to have its starting point subjacent the needle at the time the tone arm is lifted from the record and moved to the periphery thereof.

Summary of the invention

In accordance with the present invention, on the other hand, the child user selects the sound to be reproduced by a sound reproducing means of the type disclosed in said patent by positioning a conditioning means adjacent indicator means provided on the device which is symbolic of the sound to be reproduced by the device. The conditioning means is connected to a phonograph record of the multiple-speech type in such a manner that the starting point of a predetermined spiral groove is positioned by the user before pulling a draw string of the type disclosed in said patent. In one embodiment of the present inevntion, the indicator means display the letters of the alphabet in a circle provided on a housing for the sound reproducing means. Unique mounting means are employed for mounting the sound reproducing means in the housing and a unique clutching means connects the phonograph record to a conditioning means in such a manner that a child-user of the device may position the conditioning means adjacent a predetermined letter of the alphabet. Then when the child-user pulls a draw string connected to the sound reproducing means, a separate and distinct sentence is reproduced which teaches the child the selected letter. For example, should the child-user position the conditioning means adjacent the letter "A" and then pull the draw string, the device reproduces a suitable sound such as, for example, "A is for apple." In another embodiment of the present invention, animal pictures are displayed on the housing and the phonograph record contains descriptive information about the animals and a sound characteristic as that produced by the animals. Thus, the device of the present invention combines with a multiple-speech phonograph of the type disclosed in Patent No. 3,017,187 means for teaching a user of the device useful information, such as the alphabet or the like.

In view of the foregoing, the primary object of the present invention is to provide a teaching device having sound reproducing means which may be conditioned by a user of the device to reproduce segments of recorded information related to a subject about which the user wishes to be informed.

Another object of the present invention is to provide a device of the type described which may be employed to teach a child-user the alphabet.

Yet another object of the present invention is to provide a sound reproducing means of the type described having a record provided with a plurality of spaced, spiral grooves or sound tracks each capable of reproducing a separate sentence to teach a user of the device useful information, relating to subjects selected by the user.

A further object of the present invention is to combine with a multiple speech phonograph of the type disclosed in Patent No. 3,017,187 means for teaching a user of the device useful information about particular subjects selected by the user.

A still further object of the present invention is to provide new and useful mounting means for mounting a phonograph of the type disclosed in Patent No. 3,017,187 in an attractive housing means.

Another object of the present invention is to provide a unique conditioning means for a multiple speech phonograph of the type disclosed in Patent No. 3,017,187 which permits a user of the device to condition the device to reproduce predetermined segments of recorded information about a subject selected by the user.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

*Brief description of the drawings*

FIGURE 1 is a perspective view of a teaching device of the present invention;

FIGURE 2 is an enlarged, partial cross-sectional view taken along line 2—2 of FIGURE 1;

FIGURES 4A and 4B are enlarged, exploded perspective views of the device of FIGURE 1;

FIGURES 6, 6A, 7,7A, 8 and 8A are cross-sectional views showing somewhat diagrammatically the relative positions of certain parts employed in a conditioning means of the present invention during various operative positions of the device of the present invention; and FIGURE 9 is a partial, exploded perspective of a modification which may be made to the device of FIGURE 1.

*Description of the preferred embodiments*

Figure 3:
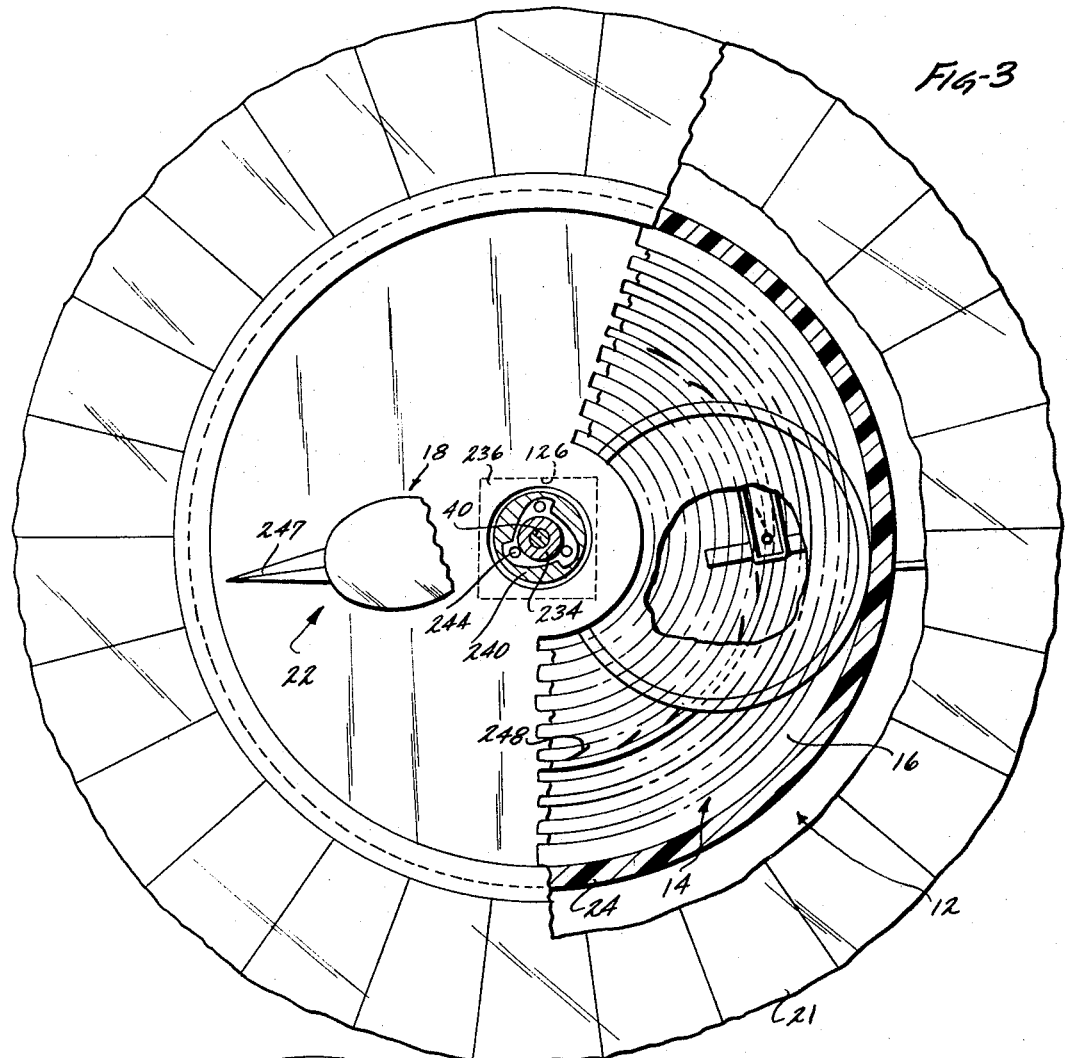
FIGURE 3 is an enlarged, partial cross-sectional view taken along line 3—3 of FIGURE 2.

Referring again to the drawings, a teaching device constituting a first embodiment of the present invention, generally designated 10, includes a housing means 12 in which a sound reproducing means in the form of a phonograph device 14 is mounted. The sound reproducing means or phonograph device 14 includes a multiple-speech phonograph record 16 of the type disclosed in Patent No. 3,017,187 which is positionable in a manner to be hereinafter described by a conditioning means 18 in such a manner that the sound reproducing means 14 is conditioned to reproduce predetermined segments of information contained on the record 16. This information is adapted to teach a child-user of the device about subjects displayed visually on the housing 12 adjacent the conditioning means 18 by suitable indicator means or indicia 20. The indicia 20 are displayed on a circular label 21 and are shown for purposes of illustration, but not of limitation, as comprising the letters of the alphabet. The phonograph record 16 is provided with predetermined segments of recorded information in the form of suitable sentences designed to teach a child-user of the device 10, the letters of the alphabet. For example, if the child-user conditions the device 10 by positioning the conditioning means 18 in such a manner that an indicator 22 forming a portion thereof, points at the letter "A," as indicated by the numeral 20a, then the phonograph device 14 will, through means and in a manner to be hereinafter described, reproduced the following sentence: "A is for apple." An apple may be represented symbolically on the housing 12 by a suitable indicia, as shown at 20b in FIGURE 1.

Figure 4B:
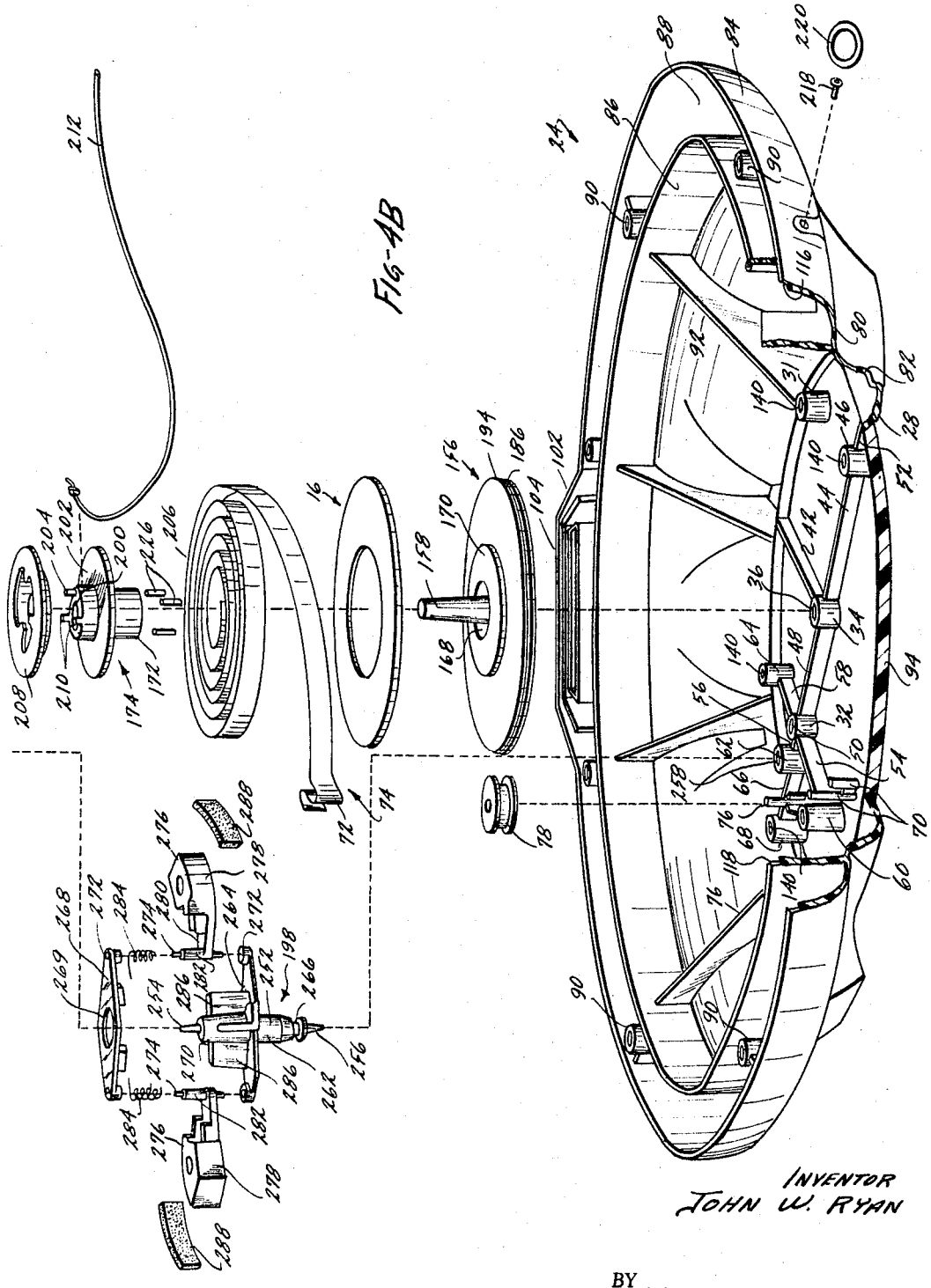

The housing 12 may be made by any suitable manufacturing technique employing any suitable material and is shown for purposes of illustration, but not of limitation, as being injection molded from a polystyrene plastic in two, separate molding operations wherein a bottom housing portion 24 is formed in one operation and a cover member 26 is formed in another molding operation. The lower housing portion 24, as best seen in FIGURE 4B, includes a circular bottom wall 28 having a circular reinforcing web 30 molded integrally therewith. A system of integrally molded reinforcing ribs and bosses, indicated generally at 32 is attached to the web 30 as shown. The system 32 includes a central boss 34 having a central bore 36 which forms a bearing for the lower end 38 of a phonograph spindle 40, forming part of the conditioning means 15. The boss 34 is connected by a first transverse web 42 to the circular web 30, by a second transverse web 44 to a second boss 46 and by a third web 48 to a third boss 50. The second boss 46 is connected by a reinforcing web 52 to the circular web 30 and the third boss 50 is connected by a plurality of reinforcing webs 54, 56 and 58 to a plurality of bosses 60, 62 and 64, respectively. The boss 62 is connected by a web 66 to yet another boss 68 which, in turn, is connected to the web 30. The bottom wall 28 is also provided with a pair of spaced, upstanding pins 70, which provide a seat for the end 72 of a main spring 74, and with an upstanding pin 76 upon which an idler pulley 78 may be rotatably mounted.

The lower housing portion 24 also includes an encompassing sidewall 80 which is formed integrally with the bottom wall 28 and which includes a portion 82 curving upwardly and outwardly from the bottom wall 28 to a suitable elevation where it is joined with an upstanding, annular lip portion 84. An inner, annular lip portion 86 is formed integrally with the encompassing sidewall 80 and is spaced from the outer annular lip 84 sufficiently to form a channel 88 therebetween. A plurality of suitably spaced, counterbored bosses 90 are provided in the channel 88 for engagement by suitable fastening means in the form of depending pins, such as the one shown at 91 in FIGURE 2, on the cover member 26. The inner, annular lip 86 is connected by a plurality of reinforcing gussets 92 to the circular web 30 for reinforcing the sidewall 80. The bottom wall 28 provides a flat surface 94 adapted to support the device 10 on a table or the like. Alternatively, the device 10 may be stood upright on a pair of legs 96 each of which has a lower portion 98 formed integrally with the sidewall 80 and an upper portion 100 formed integrally with the cover portion 26. The device 10 may be conveniently carried by a handle member 102 having a lower handle half 104 formed integrally with the lower housing portion 24 and an upper housing half 106 formed integrally with the cover portion 26.

The cover portion 26 includes a top wall 108, a depending, encompassing sidewall 110, a depending, annular reinforcing lip 112 and a stepped portion 114. The sidewall 110 and the reinforcing lip 112 fit against peripheral shoulders 116 and 118 provided on the lip portions 84 and 86, respectively, of the lower housing portion 24. The stepped portion 114 is provided with suitable openings forming a speaker grill 120 which carries a depending pin 122. The portion 114 is also provided with an aperture 124 surmounted by a square recess 126. The phonograph device 14 is mounted in the lower housing portion 24 by a frame or mounting means 128 which may be rigidly affixed to the bottom wall 28 by a plurality of depending pins 130, 132, 134, 136 and 138 adapted to engage counter bores 140 provided in the bosses 31, 46, 60, 64 and 68, respectively. The frame 128 may be of injection-molded polystyrene construction formed during a single molding operation and includes a governor chamber 142, a tone-arm-supporting channel 144, a tone-arm mounting pin 146, a tone-arm stop pin 148, an eyelet-receiving, U-shaped slot 150, a governor shaft-journal 152, and a turntable-shaft bearing 154.

The phonograph device 14 includes a turntable assembly 156 which, in turn, includes a hollow, slightly-tapered spindle portion 158 having internal splines 160. The splines 160 are engaged by external splines 162, provided on the phonograph shaft 40, in such a manner that the spindle portion 58 may be supported in the lower housing portion 24 with the upper end 164 of the spindle portion 158 abutting the bearing 154 when the end 38 of shaft 40 is secured in position within the aperture 36 by a suitable bushing 166. The turntable 156 also includes a small-diameter circular portion 168 and a large-diameter circular portion 170. The portion 170 is offset upwardly from the portion 168 as shown so as to form an annular opening or depression in which is received the lower end 172 of a driving-spring arbor or clutch 174, as will be described presently. The lower side of the turntable 156 has an inwardly-extending annular depression or groove 176 between the portion 168 and a downwardly-extending circular skirt 178. The portions of the turntable 156 which have just been described may be cast from a suitable metal, such as zinc. The turntable 156 also includes a circular disc 180 which may be made of plastic and which has a central bore 182 fitted around the skirt 178, as shown. At the bore 182 is a short, downwardly-extending annular flange or shoulder 184 and at the periphery of the disc 180 is a continuous flange or shoulder 186. A stem 188 extends downwardly from the portion 170 of the turntable 156 into an opening or aperture 190 in the disc 180 for holding these parts against relative rotation.

The random, message type record 16 is of substantially the same diameter as the flange 186 so that belt groove 194 is formed between the record 16 and the rim or flange 186. The groove 194 receives a driving belt 196 which, by way of example, is a means for driving a governor indicated generally at 198, as will be described presently.

The spring arbor 174 has the configuration shown in FIGURE 4B and is provided with a central bore 200 which fits over the slightly tapered spindle 158. The arbor 174 includes an extending circular portion or flange 202 which is spaced from the upper end 204 of the arbor 174 and which forms a pulley, as will be described. The inner end 206 of the spring 74 is secured to the spring arbor 174 and drives the turntable 156 in a manner to be hereinafter described. A spring-arbor flange 208 is attached to the upper end 204 of the arbor 174 by a plurality of ears 210, as shown in FIGURE 2.

A draw string 212 is wrapped around a pulley 214 formed by the flange 202 and the spring-arbor flange 208 and extends through a tone-arm assembly 216, as will be described, presently, through an eyelet 218 provided in the housing portion 24 to the exterior thereof and is attached to a ring 220 for convenient grasping and operating by a child-user, for example.

Pulling on the draw string 212 rotates the arbor 174 and winds-up the main spring 74 so that the spring is able to drive the turntable 146. A one-way clutch or drive is provided between the shaft 40 and the spring arbor 174 by providing a plurality of angularly-spaced axially-extending slots or grooves 224 on the inside of the lower skirt portion 172 of the arbor 174. The surfaces of the grooves 224 curve outwardly slightly from the central axis of the shaft 40 forming spaces between the spindle 158 and the skirt 172 in which rollers or bearing members 226 are disposed. As may be seen in FIGURE 7, if the arbor 174 is rotated in a counter-clockwise direction, the rollers 226 move to the wider part of the slots 224 and thus do not frictionally engage between the skirt 172 and the spindle 158 so that the arbor 174 is free to be rotated by the draw string 212 to tension spring 74 without imparting rotation to the spindle 158. On the other hand, if the arbor 174 is driven in a clockwise direction by spring 74 as shown in FIGURE 8, the rollers 226 move to the narrower part of the slots 224 so as to frictionally engage between the arbor 174 and the spindle 158 to drive the turntable 156. Thus, when the draw string 212 is pulled to wind the spring 74 by rotating arbor 174 in one direction, the turntable 156 and the photograph record 16 are not rotated. The phonograph record 16 is, however, rotated in the opposite direction while being driven by the spring 74.

The conditioning means 18 includes a one-way clutch or drive 228 which is provided between the indicator 22 and the shaft 40 for preventing rotation thereof in a counter-clockwise direction, as viewed in FIGURE 6A. The clutch 228 includes an indicator connector 230 which may be rigidly affixed to the indicator 22 by suitable screw means, such as the screw shown at 232, and which includes an internally-splined hub portion 234 non-rotatably connecting the indicator 22 to the splined end 235 of shaft 40. The clutch 228 also includes an indicator-locking member 236 having a non-circular, flanged portion 238 non-rotatably supporting the locking member 236 within the aperture 136 on top wall 108 of the upper housing portion 26. The locking member 236 includes an upstanding skirt portion 240 having angularly-spaced, axially-extending grooves 242, the surfaces of which curve outwardly slightly from the central axis of the shaft 40. The grooves 242 form spaces between the hub portion 234 and the skirt 240 in which a plurality of rollers or bearing members 244 are mounted. When the indicator 22 is rotated in a clockwise direction, as viewed in FIGURE 6A, the hub 234 will cause the bearings 244 to move into the enlarged part of the grooves 242 so that a frictional connection between the skirt 240 and the hub 234 is not affected. Thus, the hub 234 is free to rotate and impart rotation to the shaft 40 in a clockwise direction. The shaft 40 also causes the spindle 158 to rotate in a clockwise direction carrying the bearings 226 into the enlarged portion of the grooves 224 so that the arbor 174 is not affected by rotation of the spindle 158. Thus, the spindle 158 is free to rotate and position the photograph record 16. Should an attempt be made to rotate the indicator 22 in a counter-clockwise direction, the bearings 244 will be wedged against the narrow portions of grooves 242 connecting the hub 234 in driving engagement with the skirt 240. However, rotation of shaft 40 is prevented by the square flange 238 which is non-rotatably received in the square aperture 126.

Figure 5:
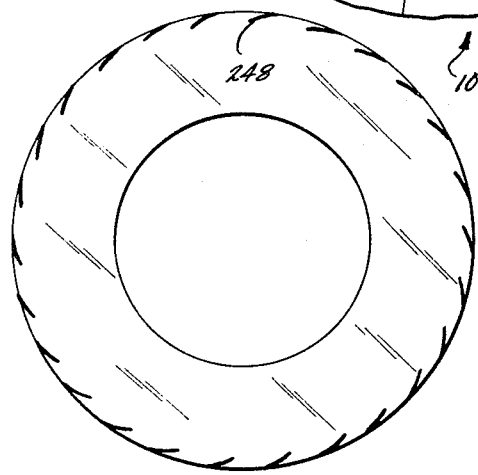
FIGURE 5 is a plan view of a multiple speech phonograph record employed in the device of FIGURE 1.

The indicator 22 may be molded in the form of a simulated bumblebee by injection-molding it from a polystyrene plastic and includes a pointer 247 simulating a bee's stinger. When the indicator 22 is rotated in a clockwise direction, the pointer 247 may be positioned adjacent a suitable letter, such as the letter "A." This conditions the sound reproducing means 14 to reproduce a predetermined segment of the information recorded on record 16 by placing a lead-in groove 248 (FIGURE 5) on record 16 in a suitable playing position. The lead-in groove 248 is the "fast pitch" type described in Patent No. 3,017,187 to assure playing of the proper selection. As will be explained presently, when the tone-arm 216 with its needle 250 is moved by the draw string 212 to the periphery of the record 16, the needle 250 will engage the lead-in groove 248 for the letter "A." The draw string 212 not only positions the needle 250, but also tensions spring 74 by rotating arbor 174. Thus, the record 16 automatically plays a predetermined segment of recorded information related to the letter "A" when the drawstring is released.

The governor 198 regulates the speed at which the record 16 is driven by the spring 74 and comprises a rotor 252 having an upper end 254 journaled in the bushing 152 provided on the member 128. The lower end 256 of the rotor 252 is journaled by a bushing 257 mounted in a counter bore 258 provided in the boss 62. The rotor 252 has an enlarged portion 262 and at the upper end of this portion is an extending web 264. Adjacent the lower part of the enlarged portion 262 is a drive pulley 266 formed by providing a groove intermediate the spindle 256 and the enlarged portion 262. The driving belt 196 is trained about the pulley 266 as shown in FIGURE 2 for driving the governor 198. It should be understood, of course, that other types of drives, such as a gear drive, may be utilized for driving the governor. An upper web member 268 is similar in shape to the lower web member 264 and has a central aperture 269 which fits over the upper end portion 270 of the rotor 252. The ends of each of the enlarged web portions 264 and 268 are provided with apertures 272 for pivotally mounting posts or pins 274 between the web members 252 and 268. Each pin 274 carries a radially moveable governor member or weight 276 which is moveable outwardly under the influence of centrifugal force due to the pivotal mounting of the pins 274 in the apertures 272. Each of the weights 276 includes an arcuate weight portion 278 having a mounting arm 280 connected integrally to a bushing 282 journaled as shown on an associated pin 274. A torsion spring 284 is wrapped around each bushing 282 to normally urge its associated weight 278 inwardly, as more fully described in Patent No. 3,017,187. Inward movement of each weight 278 is limited by an upstanding web 286 provided on the rotor 252. A strip of fabric 288 may be adhered to each weight 278 to serve as a braking material when urged into engagement with the housing 142 by centrifugal force. The governor 198 is driven at an appropriate speed by the belt 196 and, as the speed increases, the weights 278 are urged outwardly under the influence of centrifugal force against the force of the torsion springs 284. The fabric members 288 then engage the interior surface of the housing 142 to restrain rotation of the governor 198 and limit the speed of rotation. In this manner, the speed of rotation of the record 16 is controlled and maintained at an optimum speed for desirable reproduction of sounds.

The tone-arm 216 may be made from an injection-molded polystyrene and includes a first end 290 which is provided with an aperture 292 and a second end 294 from which the needle 250 depends. The tone-arm 216 is also provided with an elongated bar 296 on its upper surface. The end 294 is with a transverse aperture 298 in which a first eyelet 300 may be mounted. The draw-string 212 passes from the arbor 174 downwardly through the eyelet 300 and then upwardly through a second eyelet 302 mounted in the U-shaped slot 150 on frame 128. The draw-string 212 then passes through the eyelet 218 in the housing portion 24 to the exterior thereof. The tone-arm 216 may be pivotally mounted on the frame 128 by engaging the aperture 292 on the pin 146 in such a manner that the tone-arm 216 may swing radially over the record 16. When the draw-string 212 is tensioned by pulling the ring 220, the draw-string lifts the tone-arm 216 from the record 16 and moves it over against the tone-arm stop 148. Then when the draw-string 212 is released, the tone-arm 216 automatically lowers onto the record 16.

A plastic speaker cone 304 of the type described in Patent No. 3,017,187 may be adhesively secured to the underside of the speaker grill 120. The speaker cone 304 includes a cylinder 306 which may be adhesively secured in position in a central aperture 308 provided in the apex portion 310 of cone 304. A piston 312 is slidably mounted in the cylinder 306 and is biased into engagement with the transversely extending rib 296 on the tone-arm 216 so that sonic vibrations may be transmitted from the tone-arm 216 to the cone 304. The spring 314 includes an end 316 which engages the pin 122 on the cover member 26 and an end 318 which is positioned within the piston 312 and bears against the bottom wall portion 320 thereof.

In use, the sound reproducing means 14 is conditioned by conditioning means 18 to reproduce a predetermined segment of the recorded information on record 16 related to a subject about which a user of the device 10 wishes to be informed. This subject is displayed on the cover member 26 in the form of indicia 20a representing the letter "A" of the alphabet. When the pointer 247 on indicator 22 is brought into alignment with the indicia 20a, it indicates to the user that the reproducing means 14 is conditioned to reproduce the particular segment of record 16 having recorded information related to the letter "A."

Referring now to FIGURE 9, the embodiment of the invention designated 10 may be modified by replacing the label 21 with a label 21a. The label 21a is provided with indicia 20c in the form of animals, birds and the like and may be mounted on the housing 12 in place of the label 21. The indicator 22 may then be replaced with an indicator 22a which is shaped in the form of a farmer having a finger 247a serving as a pointer to point at the various animals and birds shown on the label 21a. The record 16 is replaced by a record 16a having information recorded thereon which relates to the indicia 20c. The record 16a includes a lead-in groove 248a which directs the needle to 250 into a sound-track reproducing a predetermined segment of the information recorded on record 16a in the form of a suitable sentence applicable to the indicia 20c with which the pointer 247a has been previously aligned. For example, the indicia 20c may be that of a duck. When the indicator 22a is turned so that the finger 247a points at the duck, the record 16a will be positioned in such a manner that the lead-in groove 248a will direct the needle 250 into a sound-track saying, "I am a duck. I go quack, quack, quack." The very sound made by a duck may be recorded on the record 16a, if desired.

Operation of the device 10 will be readily understood. The transversely extending rib 296 on tone-arm 216 slidably engages the bottom wall 320 on the piston 312 which, as described, is slidably mounted in the cylinder 306 and is biased into engagement with the rib 296 by the spring 314. The tone-arm 216 is movable about its pivotal mounting so that the needle 150 can be swung from an intermediate point on the record 16 at the end of its playing surface to its periphery. When the tone-arm 216 so moves, the rib 296 slides frictionally relative to the bottom wall 320 of the piston 312. Thus, the reproducing cone 304 does not move with the tone-arm 216. As may be seen in FIGURE 2, the eyelet 300 in the tone-arm 216 is slightly below the flange or circular part 202 on the spring arbor 174 around which the draw-string is wrapped. Normally, when the needle 250 has moved to the interior of the playing surface of the record 16, the indicator 22 may be rotated in a clockwise direction into alignment with a suitable letter of the alphabet and the draw-string 212 is manipulated by pulling it to tension it. The tension in the draw-string 212 is sufficient to lift the tone-arm 216 from the surface of the record 16 against the force of the spring 314. As the draw-string 212 is pulled, the friction between it and the interior of the eyelet 300 is sufficient to move the tone-arm 216 to the periphery of the record 16. At this point, its movement is terminated by the stop member 148.

The tone-arm 216 has now been properly positioned so that the needle 250 will engage the spiral groove 248 which has been previously positioned thereunder by moving the indicator 22. The draw-string rotates the spring arbor 174 to wind up the main spring 74 thereby storing sufficient energy to drive the turntable 158 when the draw-string is released. As the turntable 158 rotates by virtue of the spring force, the sound recorded on the sound-track 248 is reproduced by the speaker cone 304 to speak a sentence applicable to the aligned indicia 20.

As may be observed, the particular nature of the sound reproducing means provides a construction which is simple and effective but yet very rugged and durable and capable of withstanding rather rough treatment. Particularly, it will withstand and properly respond to any manipulations that may be made by a child-user who does not, of course, understand the details of the mechanism but foresees only that by pulling the draw-string 212, the device will be caused to reproduce a sound characteristic of the indicia at which the indicator 22 is directed. Thus, a child may be readily taught the alphabet or may become acquainted with the different animal sounds and the names of the animals and birds and the like. The nature of the mechanism is such that it does not impose the requirement on the child-user that the length of the pull of the draw-string or the force exerted must be nicely judged or gauged. The device therefore, accommodates itself very well to the treatment expected to be given it by children.

While the record 16 is being played, the governor 198 is, of course, being driven in a manner previously described and, as explained, the governor regulates and controls the speed of rotation of the record 16 to provide for optimum reproduction conditions.

From the foregoing, those skilled in the art will observe that the invention embraces the fascinating concept of providing a device which will figuratively speak for itself and is adapted to say educational items which the child-user may pick out. The invention embraces the concept of a device which a child-user, for example, may ask questions of, by rotating the indicator 22 and then receive a response from, which response is, in effect, chosen and selected by the child-user.

Those skilled in the art will observe that the physical embodiment of the invention as disclosed herein provides novel and original features and structural arrangements providing for a very high degree of effectiveness and utility. The movements in the device are extremely simplified and extraordinarily adapted to treatment to be expected from a child. The tone-arm moves relatively to the reproducing cone requiring that the latter be none of the moving parts. The actual movements are limited to movements absolutely necessary toward required operations and are reduced to a very simple form.

The unique clutch arrangement provided by the clutch devices 174 and 228 assures that the indicator 22 may be readily aligned with a predetermined indicia and simultaneously that the record 16 will be properly positioned while, on the other hand, the indicator 22 may not be rotated in the wrong direction to damage the interior parts of the device.

While the particular teaching devices herein shown and described in detail are fully capable of attaining the objects and providing the advantages hereinbefore stated, it is to be understood that they are merely illustrative of the presently preferred embodiments of the invention and that no limitations are intended to the details of construction or design herein shown and described other than as defined in the appended claims.

What is claimed is:

1. In a phonograph for use in a teaching device, the combination comprising:
 housing means;
 a phonograph record rotatably mounted in said housing means, said record having recorded thereon a plurality of sound sequences containing educational information to be taught to a user of said device, said record comprising a disc record, each of said sound sequences being recorded in a separate spiral groove, said spiral grooves being interleaved on said record with the beginning of each sound sequence being adjacent the outer periphery of said record;
 driving means connected to said record for rotating said record, said driving means including spring means connected to said record, said spring means becoming tensioned when said driving means is rotated in a first direction, whereby said spring means may store energy for rotating said record in a second direction opposite to said first direction;
 sound reproducing means engageable with said record for reproducing said sound sequences when said record is rotated;
 first manually controlled means for positioning said record at the beginning of a predetermined sound sequence, said first manually controlled means including one-way clutch means for permitting positioning of said record by rotating said record only in said second direction, whereby said spring means remains untensioned during said positioning of said record at the beginning of said sound sequence so that said record will remain stationary after a positioning operation has been completed;
 second manually controlled means for energizing said driving means;
 means responsive to operation of said second manually controlled means to position said sound reproducing means at the starting point of said predetermined sound sequence, whereby said predetermined sound sequence may be reproduced upon operation of said second manually controlled means;
 indicia means mounted on said housing means for providing a visual representation of said sound sequences; and
 indicator means connected to said first manually controlled means adjacent said indica, for indicating when said record is positioned at the beginning of said predetermined sound sequence.

2. A device as stated in claim 1 wherein said indicia means comprises letters of the alphabet and said sound sequences provide suitable statements relating to said letters.

3. A device as stated in claim 1 wherein said indicia means comprises pictures of animals and said sound sequences provide suitable sounds for said animals.

4. A device stated in claim 1 wherein said housing means comprises:
 a lower housing portion of molded plastic construction having reinforcing and mounting means molded integrally therewith, said mounting means mounting said record and said sound-reproducing means in said housing means; and an upper housing portion of one-piece, molded construction having a speaker grill molded therein.

5. A phonograph device comprising:
 a housing means;
 a turntable shaft rotatably mounted in said housing means;
 a turntable having an upstanding spindle keyed to one end of said shaft;
 a spring arbor encompassing said upstanding spindle, said spring arbor having angular slots providing small and large spaces between said arbor and said spindle;
 bearing members mounted in said slots for frictional engagement between said arbor and said spindle when said bearing members are positioned in said small spaces and for releasing said spindle when said bearing members are positioned in said large spaces;
 a main spring connected to said spring arbor in such a manner that said main spring will be tensioned when said spring arbor is wound in a first direction, said bearing members moving to said enlarged space out of frictional engagement with said spindle when said arbor is turned in said first direction;
 means connected to said arbor for turning it in said first direction upon release of which means said main spring drives said spring arbor in a second direction opposite from said first direction so that said bearing members come into frictional engagement with said arbor and said spindle resulting in the driving of said turntable;
 an indicator member keyed to the other end of said shaft for rotating said shaft in said second direction to position said turntable;
 clutch means connected to said other end of said shaft for preventing rotation of said indicator means in said first direction;
 indicia means mounted on said housing means adjacent said indicator means, said indicia means displaying information to be taught to a user of said device;
 phonograph record means fixedly mounted on said turntable, said phonograph record means having interleaved sound sequences recorded thereon containing said information to be taught to said user, said sound sequences each having a starting position on the periphery of said record means which is moved to a predetermined position by said indicator means; and means mounted in said housing means for reproducing sounds recorded on said phonograph record.

6. A phonograph device as stated in claim 5 wherein said indicia means comprises letters of the alphabet and said sound sequences contain information for teaching said letters to said user.

7. A phonograph device as stated in claim 5 wherein said indicia means comprises pictures of animals and said sound sequences contain sounds representative of said animals.

References Cited

UNITED STATES PATENTS

| | | | |
|---|---|---|---|
| 936,976 | 10/1909 | Berliner | 274—42 |
| 1,930,286 | 10/1933 | Runyan | 35—8.1 |
| 2,547,603 | 4/1951 | Segal et al. | 274—1.8 |
| 3,017,187 | 1/1962 | Ryan | 274—14 |

LEONARD FORMAN, *Primary Examiner.*

LLOYD V. ANDERSON, *Assistant Examiner.*